United States Patent [19]

Suzuki et al.

[11] Patent Number: 4,870,658
[45] Date of Patent: Sep. 26, 1989

[54] AMPLITUDE EQUALIZER

[75] Inventors: Toshiaki Suzuki, Tochigi; Akira Nishimura, Otawara, both of Japan

[73] Assignee: Fujitsu Limited, Kawasaki, Japan

[21] Appl. No.: 86,509

[22] Filed: Aug. 18, 1987

[30] Foreign Application Priority Data

Aug. 18, 1986 [JP] Japan .................................. 61-191636
Dec. 22, 1986 [JP] Japan .................................. 61-307470

[51] Int. Cl.$^4$ .......................... H03H 7/03; H04B 3/04
[52] U.S. Cl. ...................................... 375/12; 333/18; 333/28 R
[58] Field of Search ....................... 375/11, 12, 13, 14, 375/15; 333/18, 28 R; 455/239; 364/724

[56] References Cited

U.S. PATENT DOCUMENTS

| | | | |
|---|---|---|---|
| 3,551,854 | 3/1968 | Koichi | 333/28 R |
| 3,868,604 | 2/1975 | Tongue | 333/28 R |
| 4,027,259 | 5/1977 | Zellmer | 333/28 R |
| 4,258,340 | 3/1981 | Ryu | 333/28 R |
| 4,283,693 | 8/1981 | Saenz | 455/239 |
| 4,491,808 | 1/1985 | Saito | 333/28 R |
| 4,730,341 | 3/1988 | Saito | 375/11 |
| 4,730,342 | 3/1988 | Saito | 375/12 |

FOREIGN PATENT DOCUMENTS 60-64515 4/1985 Japan .

Primary Examiner—Robert L. Griffin
Assistant Examiner—Stephen Chin
Attorney, Agent, or Firm—Staas & Halsey

[57] ABSTRACT

An amplitude equalizer which adds the outputs of two circuit means having opposite characteristics, whereby a flat delay-frequency characteristic and powerful frequency-amplitude characteristic are obtained. Further, a variable amplitude equalizer including two of the same connected in parallel and a variable attenuator inserted in one of the parallel paths. Still further, an automatic amplitude equalizer wherein the variable attenuator is feedback controlled by an equalization residual. The amplitude equalizer includes a minimum phase circuit and non-minimum phase circuit connected in series.

13 Claims, 17 Drawing Sheets

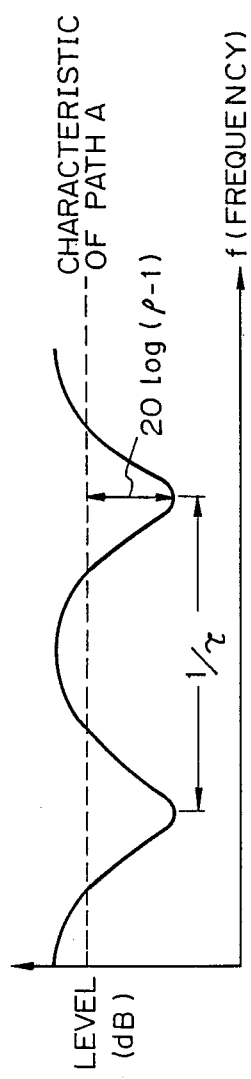
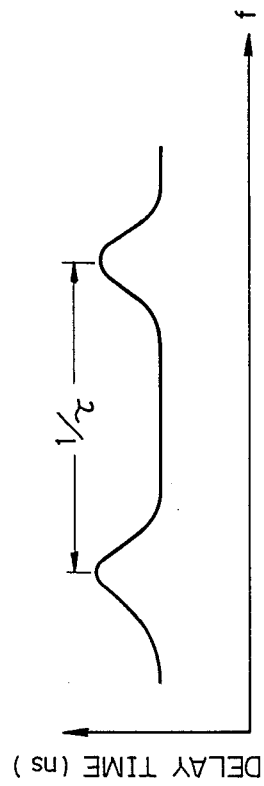
Fig. 6A
Fig. 6B

AMPLITUDE EQUALIZER

BACKGROUND OF THE INVENTION

1. Field of the Invention

The present invention relates to an amplitude equalizer, more particularly, to an amplitude equalizer able to produce an output having a flat delay-frequency characteristic and a powerful amplitude-frequency characteristic.

In the field of radio communications, particularly the field of digital microwave communications, frequency selective transmission distortion occurs due to multi-path fading. This is a major cause behind deterioration of the communication quality. This transmission distortion reaches as much as tens of decibels when it is extremely large, making difficult equalization by amplitude equalizers with weak amplitude equalization characteristics, such as used in the prior art, and, further, making adaptive equalization difficult. Therefore, demand has arisen for an amplitude equalizer which offers strong amplitude equalization characteristics and which can be easily used for adaptive equalization.

The amplitude equalizer of the present invention is useful as an equalizer for equalizing, in particular, the first order slope in amplitude distortion due to the above-mentioned multi-path fading.

2. Description of the Related Art

Known in the prior art as amplitude equalizers are those comprised of constant resistor networks using only passive elements such as capacitors (C), inductors (L), and resistors (R), resonant automatic equalizers which equalize an input signal in a frequency domain using a frequency-amplitude characteristic reverse to the frequency-amplitude characteristic of the input signal, and transversal filter type automatic equalizers which equalize in time domains.

Resonant automatic equalizers apply a variable resonator to the input signal subject to selective fading to detect the frequency in the frequency-amplitude characteristic of the input signal and detect the equalization residual in the spectrum of the equalized output signal. By control of the notch frequency which is detected and the resonant frequency of the variable resonator to match each other and by control of the quality factor of the variable resonator for a minimal equalization residual, an equalized signal is obtained as the output of the variable resonator. An amplitude equalizer using such a resonator is proposed, for example, in Japanese Unexamined Patent Publication (Kokai) No. 60-64515 (published on Apr. 13, 1985).

Amplitude equalizers using transversal filters multiply the tap outputs of delay circuits provided with taps by various tap coefficients and sum up the results of the calculations as an output. By varying the tap coefficients in accordance with an error signal obtained by discrimination of the level of the summed output, the error signal is controlled to zero and the output equalized.

Of the prior art amplitude equalizers, those comprised of constant resistor networks feature a weak resultant frequency-amplitude characteristic and have to be arranged in multi-stage constructions to obtain a powerful amplitude equalization characteristic. This complicates the circuit construction and complicates the design procedure.

In the case of approximating the frequency-amplitude characteristic due to fading by a two-wave model of a direct wave and an interference wave having a time delay relative to the same, resonant automatic equalizers can equalize the amplitude-frequency characteristic and delay-frequency characteristic when the interference wave is small with respect to the level of the direct wave However, when the interference wave is large compared with the level of the direct wave, while it is possible to equalize the frequency-amplitude characteristic, the delay-frequency characteristic is inverted, which works with the delay-frequency characteristic due to the resonance circuit to conversely deteriorate the delay-frequency characteristic of the output.

An amplitude equalizer using a transversal filter can equalize signals subjected to selective fading in the case of an interference wave larger than the level of the direct wave, but the first order component of the amplitude-frequency characteristic in the demodulator is poor, the full equalization capability cannot be exhibited.

Further, resonant automatic equalizers and transversal automatic equalizers feature complicated detection circuitry and control circuitry, resulting in not only a tendency to larger circuit sizes but also considerably difficult design procedures.

SUMMARY OF THE INVENTION

The present invention has as its object the provision of an amplitude equalizer which can equalize the first order slope using a simple construction and has as its further object the provision of an automatic amplitude equalizer which can automatically equalize the first order slope with such a simple construction.

To achieve the above-mentioned objects, the present invention features the summing of the outputs of two circuit means having opposite characteristics so as to enable equalization of the first order slope and further the addition of a feedback means to enable automatic ampliude equalization. Here, the above-mentioned circuit means having opposing characteristics are preferably a minimum phase circuit and non-minimum phase circuit. In the case of the above-mentioned automatic amplitude equalizer, use is made, as the two circuit means having opposing characteristics, of generally a positive slope first order amplitude equalizer and a negative slope first order amplitude equalizer. As the best mode, these positive and negative slope first order amplitude equalizers are comprised of the above-mentioned minimum and non-minimum phase circuits. Note that, as the above-mentioned feedback means, use is made of a first order amplitude equalization residual detection circuit

BRIEF DESCRIPTION OF THE DRAWINGS

The above-mentioned objects and features of the present invention will become clearer from the following explanation, made in reference to the attached drawings, in which:

FIG. 6A is a graph of the amplitude-frequency characteristic of the non-minimum phase circuit;

FIG. 6B is a graph of the delay-frequency characteristic of the non-minimum phase circuit;

DESCRIPTION OF THE PREFERRED EMBODIMENTS

Figure 1:
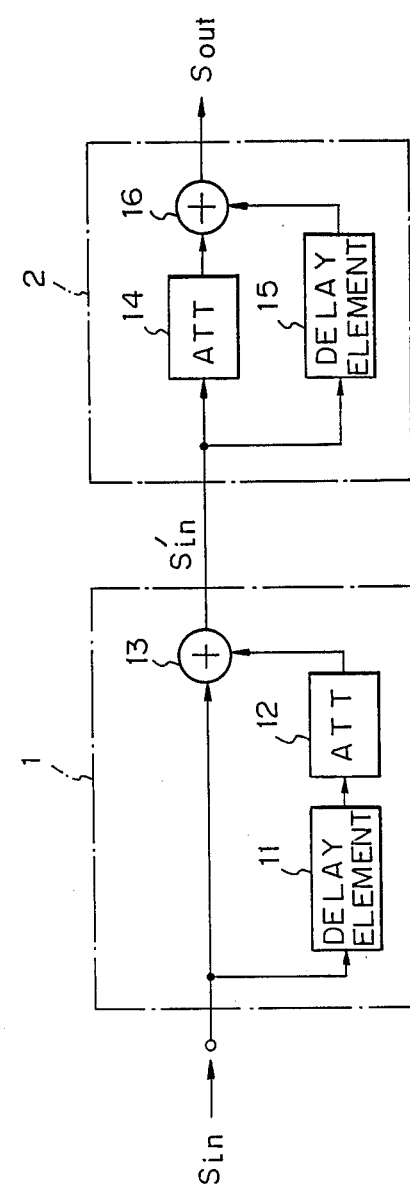
FIG. 1 is a schematic block diagram of the amplitude equalizer of the present invention.

FIG. 1 is a schematic block diagram of the amplitude equalizer of the present invention. As shown in the figure, it is constituted by a minimum phase circuit 1 and a non-minimum phase circuit 2 connected in series.

The minimum phase circuit 1 emits as an output through a combiner 13 a combination of one of the signals of an input signal $S_{in}$ branched into two ways and a signal consisting of the other signal delayed by a delay element 11 and attenuated by an attenuator 12.

The non-minimum phase circuit 2 emits as an output through a combiner 16 a combination of a signal consisting of one of the signals of an input signal $S'_{in}$ branched into two ways, attenuated by an attenuator 14, and a signal consisting of the other signal delayed by a delay element 15. Note that circuits 1 and 2 may be connected in this order or may be connected in a reverse order.

Figure 2A:
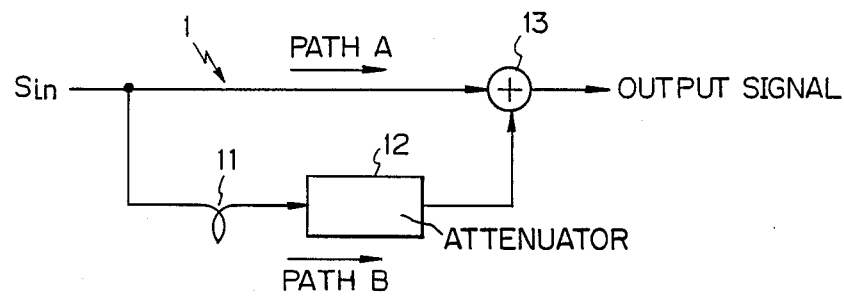
FIG. 2A is a circuit diagram of an equivalent circuit of the minimum phase circuit illustrated in FIG. 1.
Figure 2B:
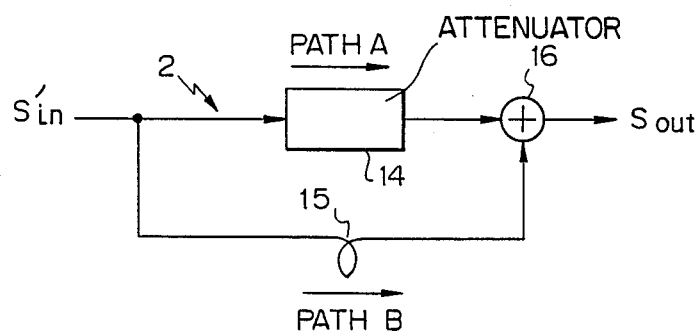
FIG. 2B is a circuit diagram of an equivalent circuit of the non-minimum phase circuit illustrated in FIG. 1.

FIGS. 2A and 2B show the equivalent circuit of the minimum phase circuit and the non-minimum phase circuit. The minimum phase circuit 1, as shown in FIG. 2A, branches an input signal into path A and path B, inserts the delay element 11 and attenuator 12 in the signal of path B, and combines the signal of path A and the signal of path B in the combiner 13 for an output. The non-minimum phase circuit 2, as shown in FIG. 2B, branches the input signal into path A and path B, inserts an attenuator in path A and inserts a delay element 15 in path B, and combines the signal of path A and the signal of path B in the combiner 16 for an output.

Here, if $\tau$ is the differential delay time of path B with respect to path A and $\rho$ is the amplitude ratio of path B with respect to path A, then the frequency-amplitude characteristic A ($\omega$) and the delay-frequency characteristic D ($\omega$) of the circuit of FIGS. 2A and 2B are as given in the following equations:

$$A(\omega) = \sqrt{1 + \rho^2 + 2\rho\cos\omega\tau} \quad (1)$$

$$D(\omega) = \frac{\rho \cdot \tau(\rho + \cos\omega\tau)}{1 + \rho^2 + 2\rho\cos\omega\tau} \quad (2)$$

Figure 3A:
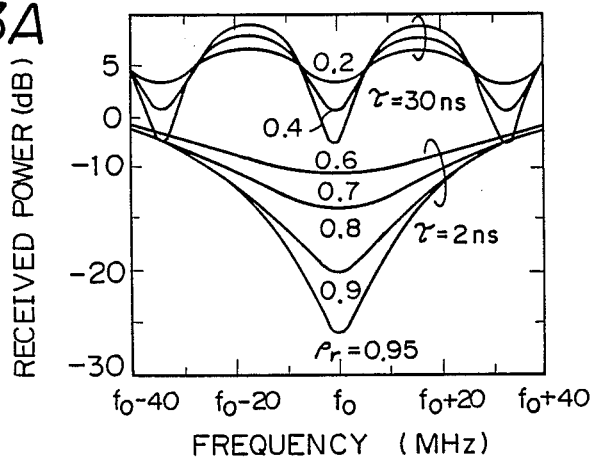
FIG. 3A is a graph of the amplitude-frequency characteristics of the circuits of FIG. 2A and FIG. 2B.
Figure 3B:
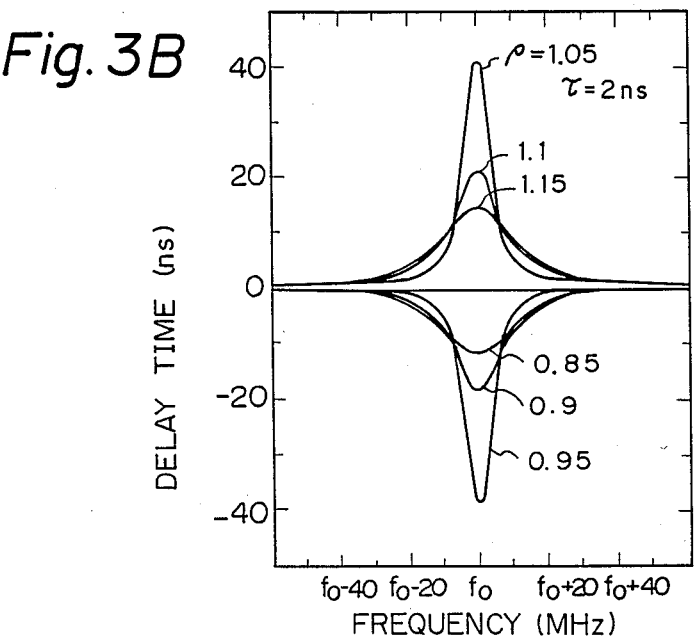
FIG. 3B is a graph of the delay-frequency characteristics of the circuits of FIG. 2A and FIG. 2B.

FIG. 3 shows the frequency-amplitude characteristic (FIG. 3A) and the frequency-delay characteristic (FIG. 3B) when $\tau$ and $\rho$ in equations (1) and (2) are changed.

As shown in FIG. 3B, the delay-frequency characteristic in the case of $\rho<1$ in FIG. 2A is reverse from the delay-frequency characteristic in the case of $\rho>1$ shown in FIG. 2B. Therefore, by connecting in series the circuit of FIG. 2A and the circuit of FIG. 2B, the delay-frequency characteristic in the output is cancelled out and the characteristic becomes flat. Only the amplitude characteristic is added on.

In such a circuit, $\rho$, $\tau$, and the phases of the paths are set appropriately to obtain the reverse characteristic from the characteristic to be equalized, thus obtaining an amplitude equalizer having the desired equalization characteristic.

Figure 4:
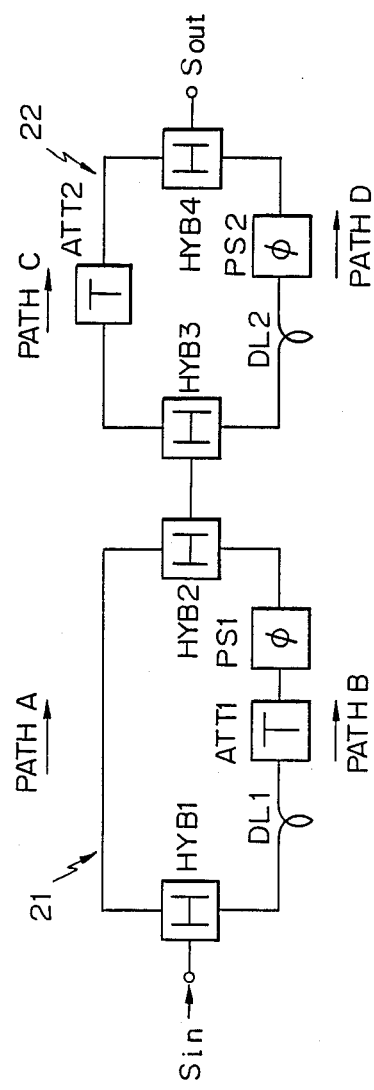
FIG. 4 is a circuit block diagram of an amplitude equalizer according to the present invention.

FIG. 4 shows an example of an amplitude equalizer according to the present invention, wherein HYB 1 to HYB 4 are hybrid circuits, DL 1 and DL 2 are delay lines, ATT 1 and ATT 2 are attenuators, and PS 1 and PS 2 are phase shifters.

In FIG. 4, an input signal $S_{in}$ is connected to the input side of the hybrid circuit HYB 1. One of the output sides of the hybrid circuit HYB 1 is connected in series to one of the input sides of the hybrid circuit HYB 2, while the other output side of the hybrid circuit HYB 1 is connected in series through the delay line DL 1 and the attenuator ATT 1 and phase shifter PS 1 to the other input side of the hybrid circuit HYB 2. The output side of the hybrid circuit HYB 2 is connected to the input side of the hybrid circuit HYB 3. One of the output sides of the hybrid circuit HYB 3 is connected via the attenuator ATT 2 to one of the input sides of the hybrid circuit HYB 4, while the other output side of the hybrid circuit HYB 3 is connected in series via the delay line DL 2 and the phase shifter PS 2 to the other input side of the hybrid circuit HYB 4.

The input signal $S_{in}$ is split to the path A and path B in the hybrid circuit HYB 1. The signal of path A is input directly to the hybrid circuit HYB 2, while the signal of path B is delayed by the delay line DL 1, attenuated by the attenuator ATT 1, shifted in phase in the phase shifter PS 1, and then input to the hybrid circuit HYB 2. The hybrid circuit HYB 2 combines the two path signals.

The output signal of the hybrid circuit HYB 2 is split to the path C and path D in the hybrid circuit HYB 3. The signal of path C is attenuated by the attenuator ATT 2, then input to the hybrid circuit HYB 4, while the signal of path D is delayed by the delay line DL 2, shifted in phase by the phase shifter PS 2, and then input to the hybrid circuit HYB 4. The hybrid circuit HYB 4 combines the two path signals.

The circuit 21 located between the hybrid circuit HYB 1 and the hybrid circuit HYB 2 comprises the minimum phase circuit. FIG. 5 shows the frequency characteristics of the minimum phase circuit, FIG. 5A showing the frequency-amplitude characteristic and FIG. 5B showing the delay-frequency characteristic.

Figure 5A:
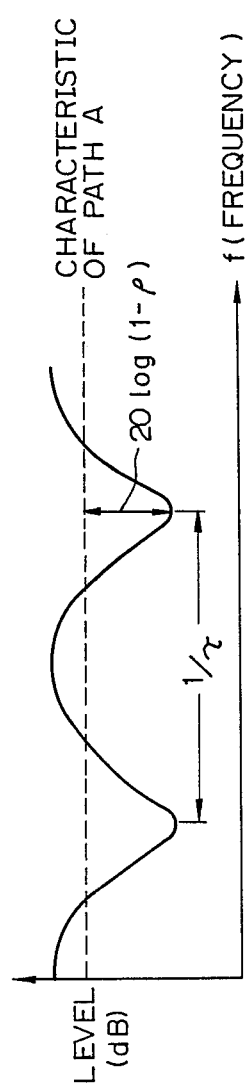
FIG. 5A is a graph of the amplitude-frequency characteristic of the minimum phase circuit.
Figure 5B:
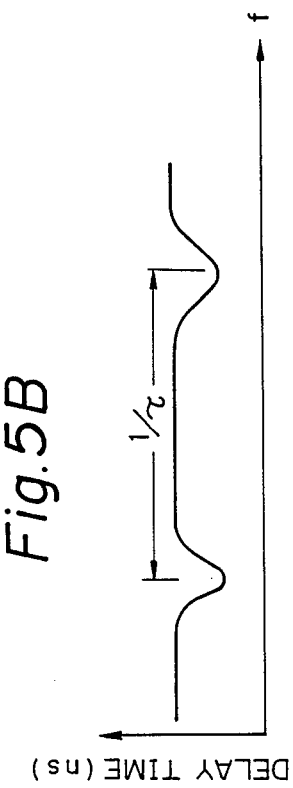
FIG. 5B is a graph of the delay-frequency characteristic of the minimum phase circuit.

In FIGS. 5A and 5B, the interval between two notch frequencies appearing in the frequency characteristics is $1/\tau$ and is determined by the delay time difference with the path A arising from the delay line DL 1 provided in path B. The depth of the notches (20 log $(1-\rho)$) is determined by the amplitude ratio of path A and path B ($\rho = B/A$) of the path A and path B. In this case, the position of the notches can be arbitrarily set by changing the phase of the path B. That is, when desiring to change just the position of the notches without changing the interval of the notches, one need only set the phase shift amount of the phase shifter PS 1 to a suitable value.

The circuit located between the hybrid circuit HYB 3 and the hybrid circuit HYB 4 constitutes the non-minimum phase circuit. FIG. 6 shows the frequency characteristics of the non-minimum phase circuit 22, FIG. 6A showing the frequency-amplitude characteristic and FIG. 6B the delay-frequency characteristic.

In FIGS. 6A and B, the above-mentioned relations are the same, but the signal level of the path D is greater than the signal level of the path C and the amplitude ratio ($\rho = D/C$) is larger than 1, so the delay-frequency characteristic is reverse to that in the case of FIG. 5B while the amplitude-frequency characteristic is the same as that of FIG. 5A (however, the depth of the notches is 20 log $(\rho-1)$.

Is clear from FIGS. 5A and B and FIGS. 6A and B, by connecting the minimum phase circuit comprised of the loop of the path A and path B and the non-minimum phase circuit comprised of the loop of the path C and path D, the output signal becomes flat in its delay-frequency characteristic and the frequency-amplitude characteristic is augmented.

Figure 7A:
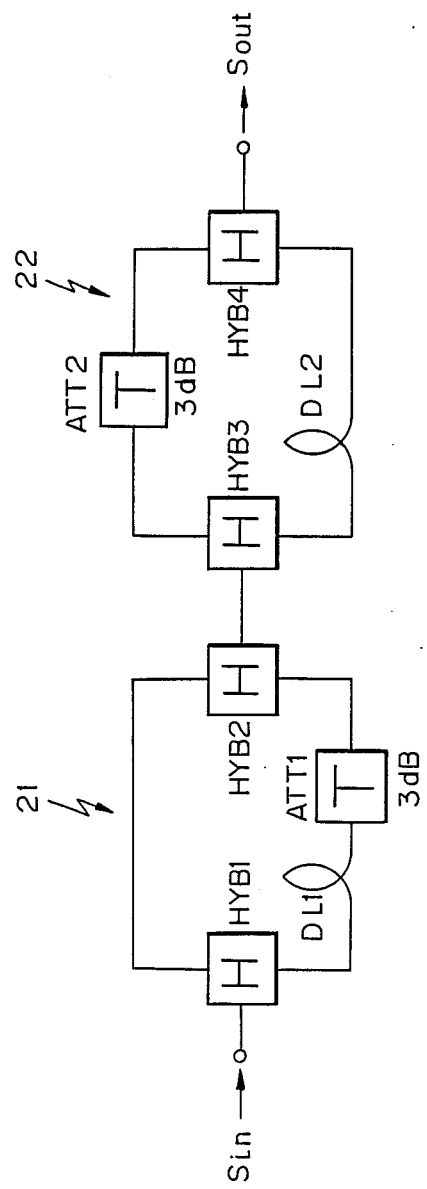
FIG. 7A is a circuit diagram of an example of an amplitude equalizer designed based on the present invention.
Figure 7B:
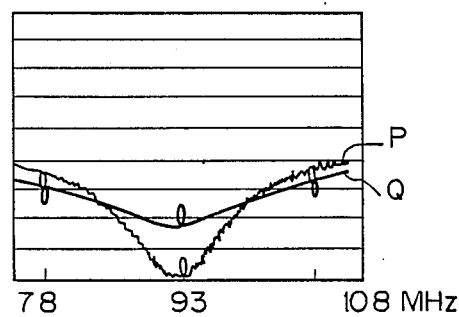
FIG. 7B is a graph of the delay-frequency characteristic and frequency-amplitude characteristic of the minimum phase circuit of FIG. 7A.
Figure 7C:
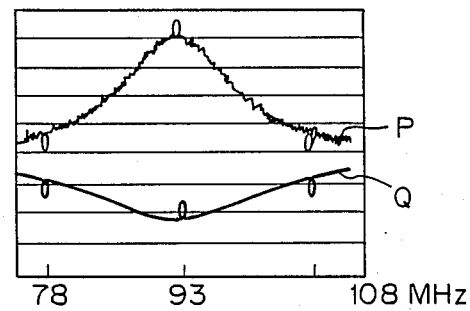
FIG. 7C is a graph of the delay-frequency characteristic and frequency-amplitude characteristic of the non-minimum phase circuit of FIG. 7A.
Figure 7D:
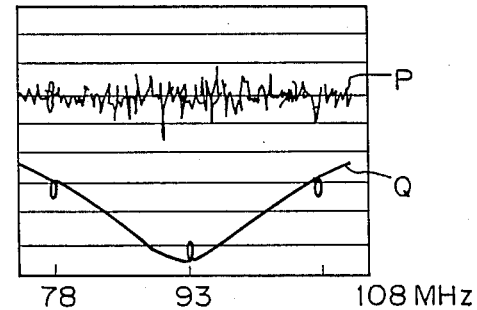
FIG. 7D is a graph of the delay-frequency characteristic and frequency-amplitude characteristic of the overall circuit of FIG. 7A.

FIG. 7A shows an example of the design of an amplitude equalizer according to the present invention. When, as shown by FIG. 7A, the illustrated values 3 db are given to the attenuators ATT 1 and ATT 2 and in-phase hybrid circuits are used for the hybrid circuit HYB 1 to hybrid circuit HYB 4, the frequency characteristics of the minimum phase circuit 21 and the frequency characteristics of the non-minimum phase circuit 22 becomes as shown by FIGS. 7B and C. The frequency characteristics of the circuit of FIG. 7A comprising these elements connected in series, become as shown in FIG. 7D. In these figures, the abscissas indicate the frequency and the ordinates indicate the delay-frequency characteristic P (5 nsec/div) and the frequency-amplitude characteristic Q (5 dB/div). As is clear from FIG. 7D, the output of the circuit of FIG. 7A is flat in its delay-frequency characteristic and augmented in its frequency-amplitude characteristic.

Figure 8:
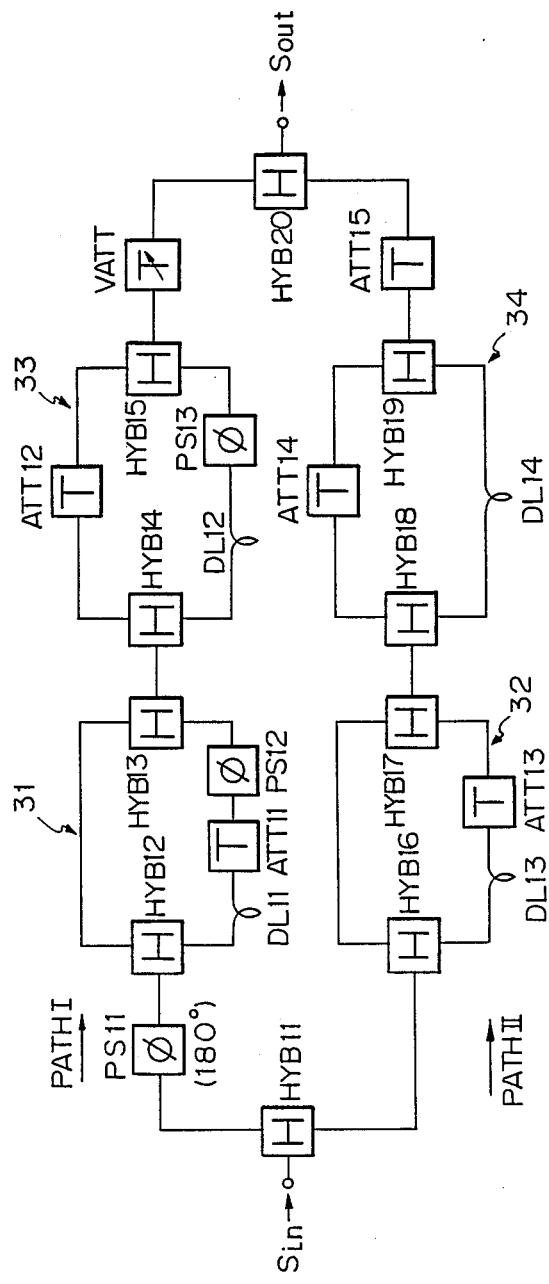
FIG. 8 is a circuit diagram of a variable first order amplitude equalizer as an example of the utilization of the amplitude equalizer of FIG. 4.

FIG. 8 shows an example of the application of the present invention, illustrating its use as a variable first order amplitude equalizer.

Figure 9:
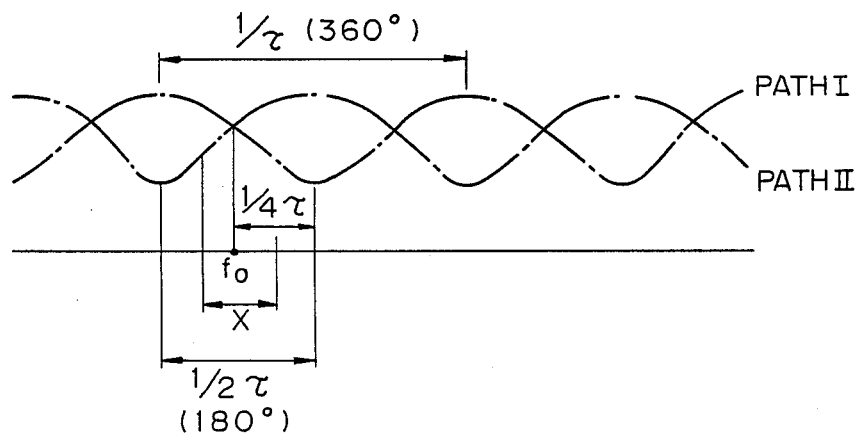
FIG. 9 is a graph of the notch frequencies of path I and path II in FIG. 8.

In FIG. 8, HYB 11 to HYB 20 indicate hybrid circuits, DL 11 to DL 14 delay lines, ATT 11 to ATT 15 attenuators, PS 11 to PS 13 phase shifters, and VATT a variable attenuator. The portions located between the hybrid circuit HYB 12 and HYB 13 and between the hybrid circuit HYB 16 and HY 17 constitute the minimum phase circuits 31 and 32, while the portions located between the hybrid circuit HYB 14 and HYB 15 and the hybrid circuit HYB 18 and HYB 19 constitute the non-minimum phase circuits 33 and 34. The circuit of FIG. 8 comprises amplitude equalizers shown in FIG. 4 connected in parallel via the hybrid circuits HYB 11 and HYB 20, with the signal level of one of the paths being made adjustable by the use of the variable amplifier VATT. In this case, the interval between the notch frequency of the path I comprised of the minimum phase circuit 31 and the non-minimum phase circuit 33 and the notch of the path II comprised of the minimum phase circuit 32 and the non-minimum phase circuit 34 is selected to be $\frac{1}{2}\tau$ by the phase shifters PS 12 and PS 13 within the path I, as shown by FIG. 9. A certain range X centered on the intersecting frequency $F_0$ of the two characteristics is used as the transmission band. Therefore, there is a relative phase difference of 180° between the signal of path I and the signal of path II. To compensate for this, the phase shifter PS 11 having the phase delay of 180° is inserted in the path I. Note that the variable attenuator VATT may be of any type so long as it can be varied in its attenuation level. Also, it may be inserted into either the path I or path II or may be inserted in both paths.

Figure 10A:
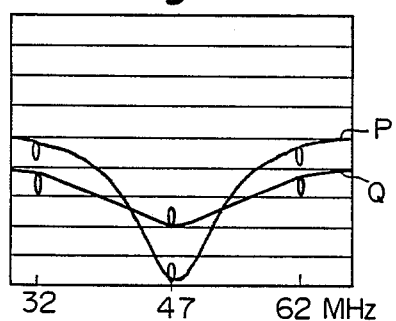
FIGS. 10A to 10C are graphs of the frequency-delay characteristic and frequency-amplitude characteristic of path I in FIG. 8.
Figure 10D:
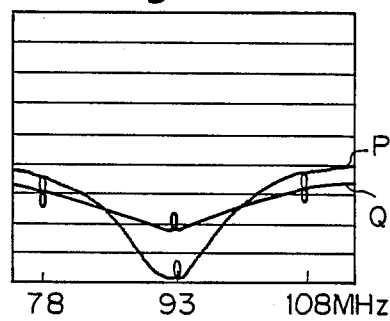
FIGS. 10D to 10F are graphs of the delay-frequency characteristic and frequency-amplitude characteristic of path II in FIG. 8.
Figure 10B:
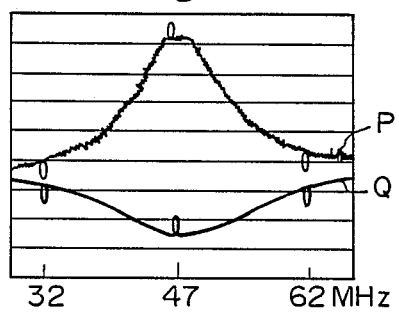
Figure 10E:
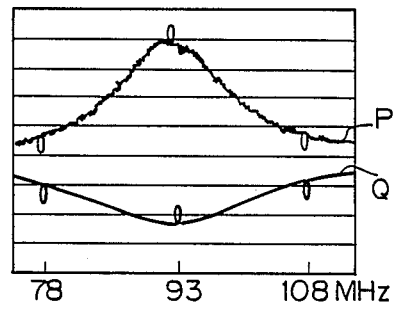

FIGS. 10A to F and 11A to C show specific examples of the characteristics of the variable first order amplitude equalizer of FIG. 8. These show the delay-frequency characteristic P (ordinate, 5 nsec/div) and the frequency-amplitude characteristic Q (ordinate, 5 dB/div) of various parts, with the frequency as the abscissa, when the notch frequencies of the minimum phase circuits 31 and 32 in the circuit of FIG. 8 are set to 47 MHz and 93 MHz, respectively, and the notch frequencies of the non-minimum phase circuits 33 and 34 are made 47 MHz and 93 MHz, respectively. FIG. 10A shows the characteristic of the minimum phase circuit 31, FIG. 10D the characteristic of the minimum phase circuit 32, FIG. 10B the characteristic of the non-minimum phase circuit 33, FIG. 10E the characteristic of the non-minimum phase circuit 34, FIG. 10C the characteristic of the path I comprised of the minimum phase circuit 31 and the non-minimum phase circuit 33 connected in series, FIG. 10F the characteristic of the path II comprised of the minimum phase circuit 32 and the non-minimum phase circuit 34 connected in series, and FIGS. 11A, 11B, and 11C the characteristics of variable first order amplitude equalizer of FIG. 8 as a whole with path I and path II connected in parallel.

Figure 10C:
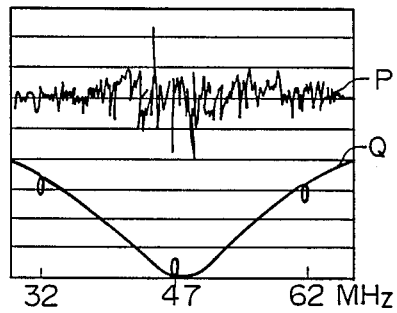
Figure 10F:
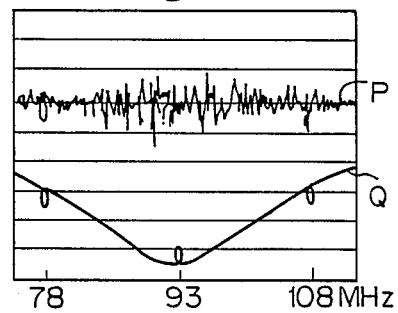

As shown in FIG. 10C, the characteristics of the path I are a combination of the characteristics of the minimum phase circuit and the non-minimum phase circuit 33. The delay-frequency characteristic is flat, and the frequency-amplitude characteristic is augmented. Similarly, as shown in FIG. 10F, the characteristics of the path II are a combination of the characteristics of the minimum phase circuit 32 and the non-minimum phase circuit 34, with the delay-frequency characteristic being flat and the frequency-amplitude characteristic being augmented. A combination of the outputs of the two paths is obtained as the output of the hybrid circuit HYB 20. At this time, three types of characteristics are obtained depending on the magnitude of the attenuation by the variable attenuator VATT.

Figure 11A:
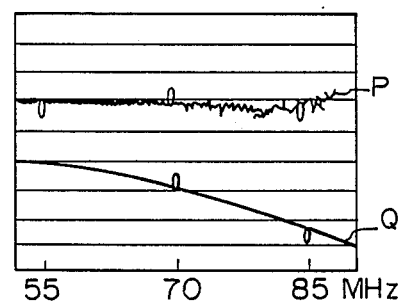
FIGS. 11A to 11C are graphs of the delay-frequency characteristics and frequency-amplitude characteristics of three modes of combinations of path I and path II in FIG. 8.
Figure 11B:
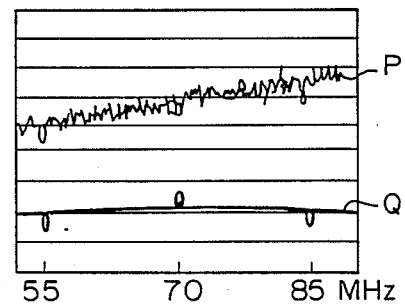
Figure 11C:
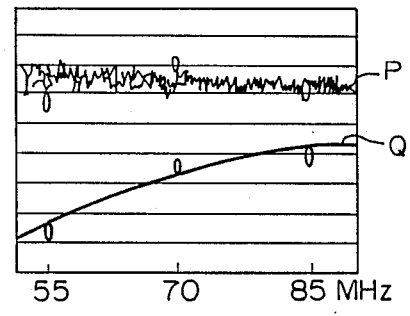

FIGS. 11A and 11C show the characteristics of the overall circuit of FIG. 8 in the case of the attenuation of the variable attenuator VATT being smaller and larger than the attenuation of the attenuator ATT 15. The delay-frequency characteristics are flat, while the frequency-amplitude characteristics become a negative first order slope and a positive first order slope, respectively. FIG. 11B shows the characteristics of the overall circuit of FIG. 8 in the case where the attenuation of the variable attenuator VATT and the attenuation of the attenuator ATT 15 are equal. Both the delay-frequency characteristic and the frequency-amplitude characteristic are flat. Note that the center frequency $f_0$ of the band in this case is the center frequency of the 47 MHz notch frequency of the path I and the 93 MHz notch frequency of the path II, that is, 70 MHz.

Figure 12:
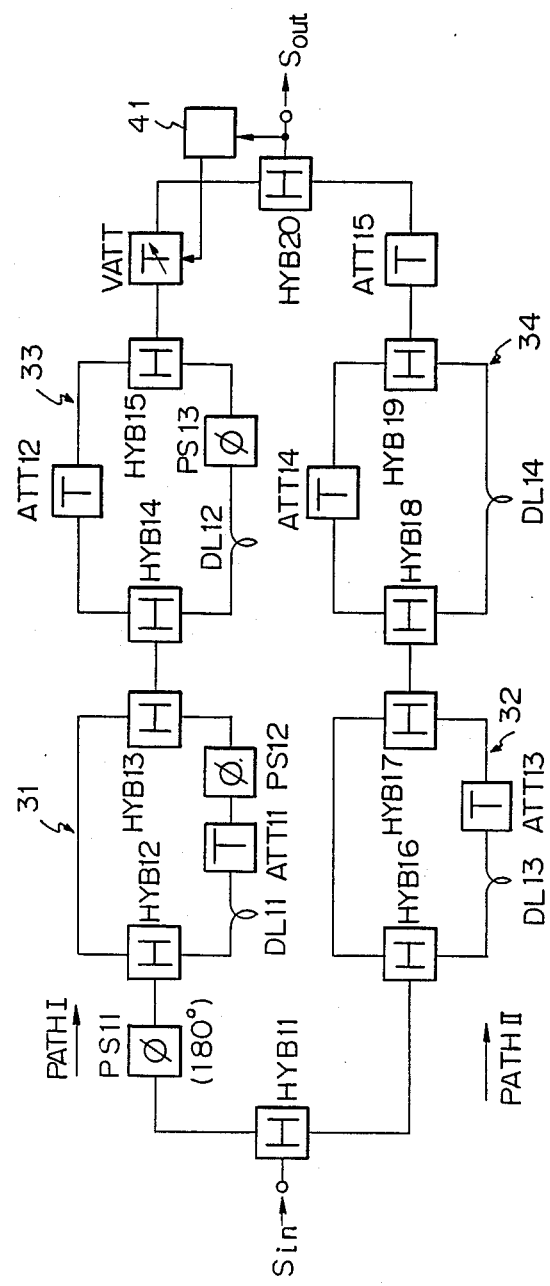
FIG. 12 is a circuit block diagram of an automatic amplitude equalizer based on the circuit of FIG. 8.

By using the variable first order amplitude equalizer shown in FIG. 8, it is possible to easily change the first order slope of the frequency-amplitude characteristic, so it is possible to easily realize an automatic amplitude equalizer. FIG. 12 is a block diagram of the constitution of an automatic amplitude equalizer based on the circuit of FIG. 8. A feedback means 41 is introduced into the circuit of FIG. 8 so as to change the amount of attenuation of the variable attenuator VATT in accordance with the equalization residual in the output signal.

Figure 13:
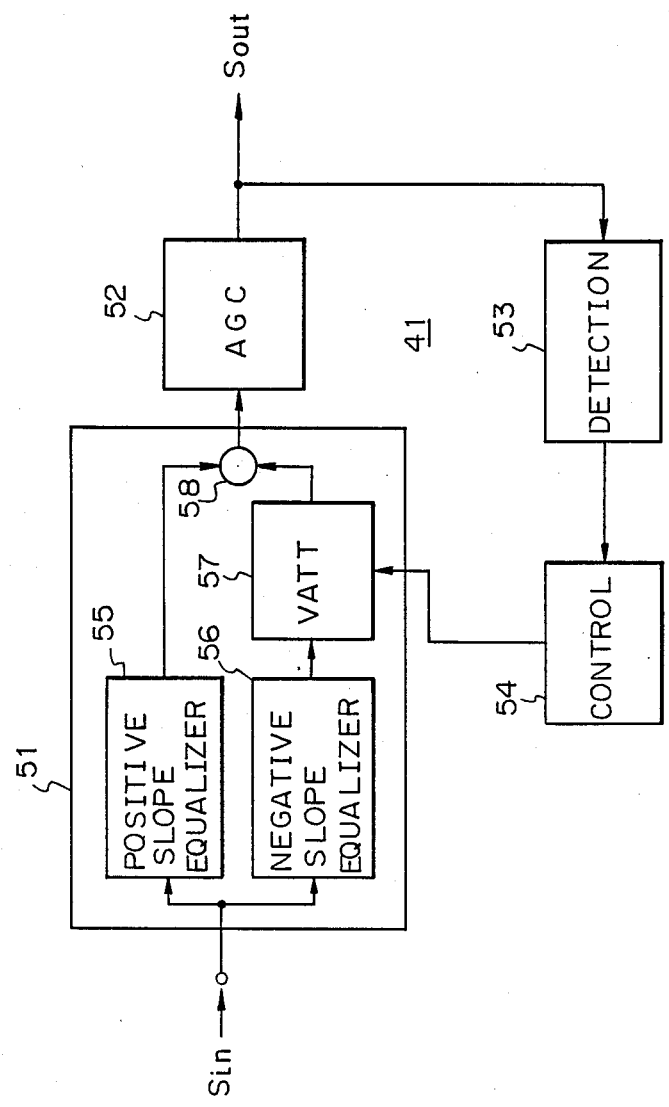
FIG. 13 is a detailed circuit block diagram of the automatic amplitude equalizer of FIG. 12.

FIG. 13 is a block diagram of a specific constitution of the automatic amplitude equalizer of FIG. 12. A variable amplitude equalization circuit corresponding to the circuit of FIG. 8 is indicated by 51 and is shown generally. It is specifically constituted by a negative slope first order amplitude equalizer 56 (corresponding to 31 and 33 in FIG. 12), a positive slope first order amplitude equalizer 55 (corresponding to 32 and 34 in FIG. 12), a variable attenuator 57 (corresponding to VATT in FIG. 12), and a combining circuit 58 (corresponding to HYB 20 in FIG. 12). On the other hand, the feedback means 41 of FIG. 12 comprises an automatic gain control (AGC) amplifier 52, a detection circuit 53, and a control circuit 54. By this, it is possible, with a simple construction, to equalize the first slope component automatically without deterioration of the delay-frequency characteristic.

Explaining the circuit of FIG. 13 in a bit more detail, the circuit is comprised of an automatic gain control amplifier 52 for making constant the output signal of a variable amplitude equalization circuit 51, a detection circuit 53 for detecting the first order amplitude equalization residual of the frequency-amplitude characteristic of the output signal of the automatic gain control amplifier 52 using a narrow band filter, a detector, etc., and a control circuit 54 for controlling the variable amplitude equalization circuit 51 based on the detected output signal of the detection circuit 53. The variable amplitude equalization circuit 51 has a variable attenuator 57 for adjusting the output signal level of either one of the positive slope first order amplitude equalizer 55 and the negative slope first order amplitude equalizer 56. The variable attenuator 57 is controlled by the above-mentioned control circuit 54. Signals are combined by a combining circuit 58 for output.

The automatic gain control amplifier 52 amplifies the signal to a certain level and outputs the result. The first order amplitude equalization residual is detected by the detection circuit 53, and, based on the detected output signal, the variable attenuator 57 of the variable amplitude equalization circuit 51 is controlled by the control circuit 54. In the variable amplitude equalization circuit 51, the output signal levels of the amplitude equalizers 55 and 56 of the positive slope and negative slope are adjusted and the vector-added, so when the two have opposite frequency-amplitude characteristics, the vector-addition results in a flat frequency-amplitude characteristic. If the amount of attenuation of the variable attenuator 57 is made larger, the frequency-amplitude characteristic of the other output signal becomes the characteristic of the combined output signal. Therefore, by controlling the variable attenuator 57 for a minimum first order amplitude residual, the first order component of the frequency-amplitude characteristic due to the fading can be equalized without deterioration of the group delay-frequency characteristic. Further, the control circuitry controls a single variable attenuator 57 through detection of the first order component, so becomes simple in construction.

Figure 14:
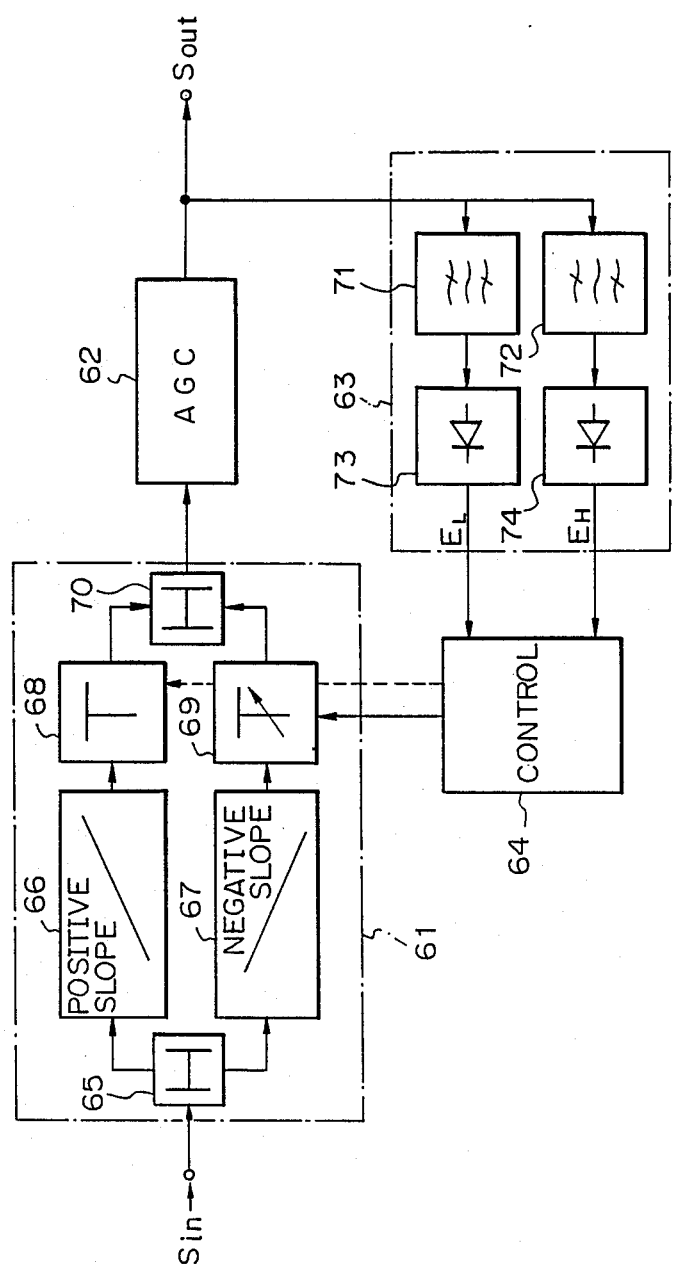
FIG. 14 is a more detailed circuit block diagram of the automatic amplitude equalizer of FIG. 13.

FIG. 14 is a somewhat more concrete block diagram of the automatic amplitude equalizer of FIG. 13. In the figure, 61 indicates a variable amplitude equalization circuit, 62 an automatic gain control amplifier, 63 a detection circuit, 64 a control circuit, 65 and 70 hybrid circuits, 66 a positive slope first order amplitude equalizer, 67 a negative slope first order amplitude equalizer, 68 a fixed attenuator, 69 a variable attenuator, 71 and 72 narrow band filters, and 73 and 74 detectors.

The signal received through a digital radio transmission line, for example, is converted in frequency to become an intermediate frequency (IF) signal and input to the variable amplitude equalization circuit 61. In this variable amplitude equalization circuit 61, the input signal is branched into two by the hybrid circuit 65 and supplied to the positive slope first order amplitude equalizer 66 and the negative slope first order amplitude equalizer 67. The output signal of the positive slope first order amplitude equalizer 66 is applied to the fixed attenuator 68 and the output signal of the negative slope first order amplitude equalizer 67 is applied to the variable attenuator 69. The output signals of the fixed attenuator 68 and the variable attenuator 69 are applied to the hybrid circuit 70 and vector added. In this case, by controlling the variable attenuator 69 (for example, PIN diode) by the control circuit 64, it is possible to obtain a desired negative first order slope characteristic as the combined output characteristic, so it is possible to compensate for the first order component of the frequency-amplitude characteristic of the input signal.

The output signal of the variable amplitude equalization circuit 61 is amplified so as to become fixed in level by the automatic gain control amplifier 62. The first order amplitude equalization residual is detected by the detection circuit 63 from the output signal of the automatic gain control amplifier 62. In the detection circuit 63, different frequency components are extracted by the band filters 71 and 72, detected by the detectors 73 and 74, and supplied to the control circuit 64.

In the control circuit 64, the levels of the output signals detected by the detectors 73 and 74 are compared and the variable attenuator 69 is controlled in accordance with the first order amplitude equalization residual. For example, when the detected output signal levels are equal, the amount of attenuation of the variable attenuator 19 is controlled to be the same as the attenuation of the fixed attenuator 68. Vector addition of the characteristics of the positive slope first order amplitude equalizer 66 and the negative slope first order amplitude equalizer 67 gives a flat frequency-amplitude characteristic.

When the level ($E_H$) of the detected output signal having the higher frequency is greater than the level ($E_L$) of the output signal having the lower frequency, the first order amplitude equalization residual exhibits a positive slope first order amplitude characteristic, so control is effected to reduce the attenuation of the variable attenuator 69. The variable amplitude equalization circuit 61 is made to exhibit a negative slope frequency-amplitude characteristic, and it is possible to equalize the frequency-amplitude characteristic resulting from the fading.

Figure 15:
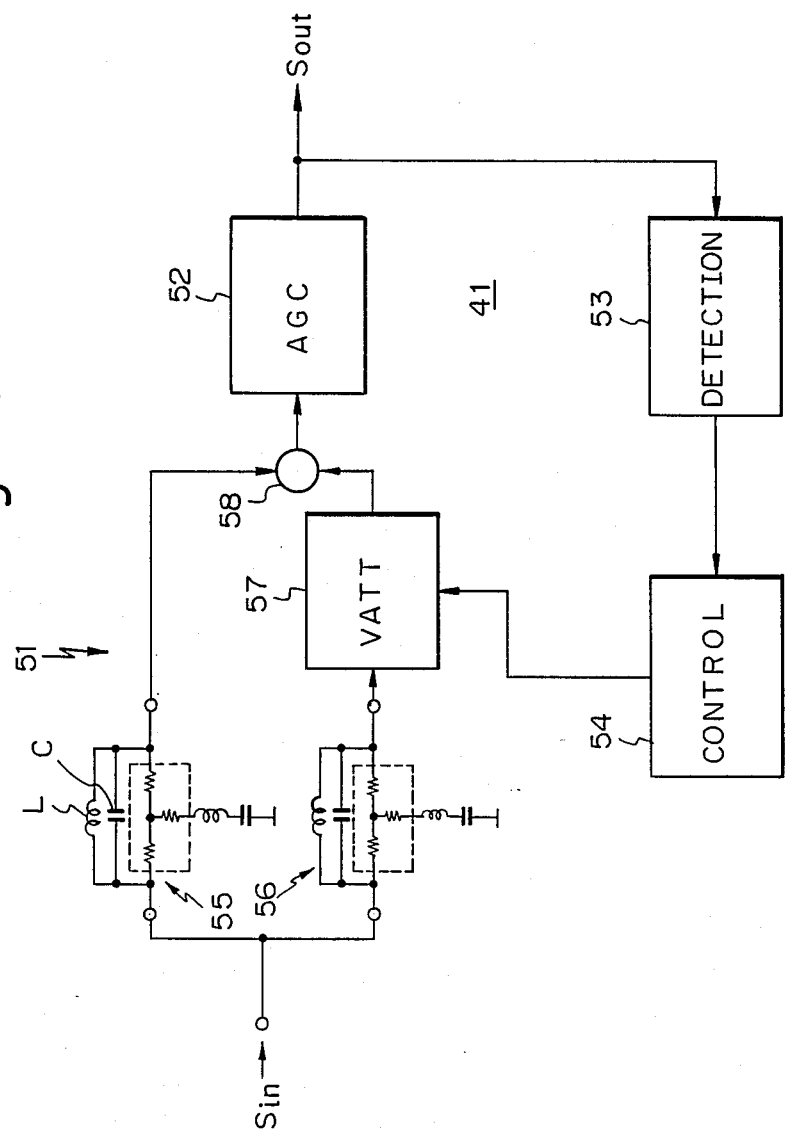
FIG. 15 is a circuit block diagram of a variable amplitude equalization circuit of FIG. 14.

In the above-mentioned embodiment, the output signal of the negative slope first order amplitude equalizer 67 was added to the variable attenuator 69, but it is also possible to structure things so that the output signal of the positive slope first order amplitude equalizer 66 is applied to the variable attenuator 69 and the output signal of the negative slope first order amplitude equalizer 67 is applied to the fixed attenuator 68. Further, it is possible to make both the two attenuators (68 and 69) variable. Still further, while it is advantageous to use equalizing circuits of the structure of FIG. 4 for the positive slope and negative slope first order amplitude equalizers 66 and 67, when a strong frequency-amplitude characteristic is not required, use may be made of a conventional equalization circuit using capacitors (C), inductors (L), and resistors (R). FIG. 15 shows another embodiment of the variable amplitude equalization circuit of FIG. 13, wherein general L-R-C type circuits are used for the equalizers 55 and 56.

Figure 16:
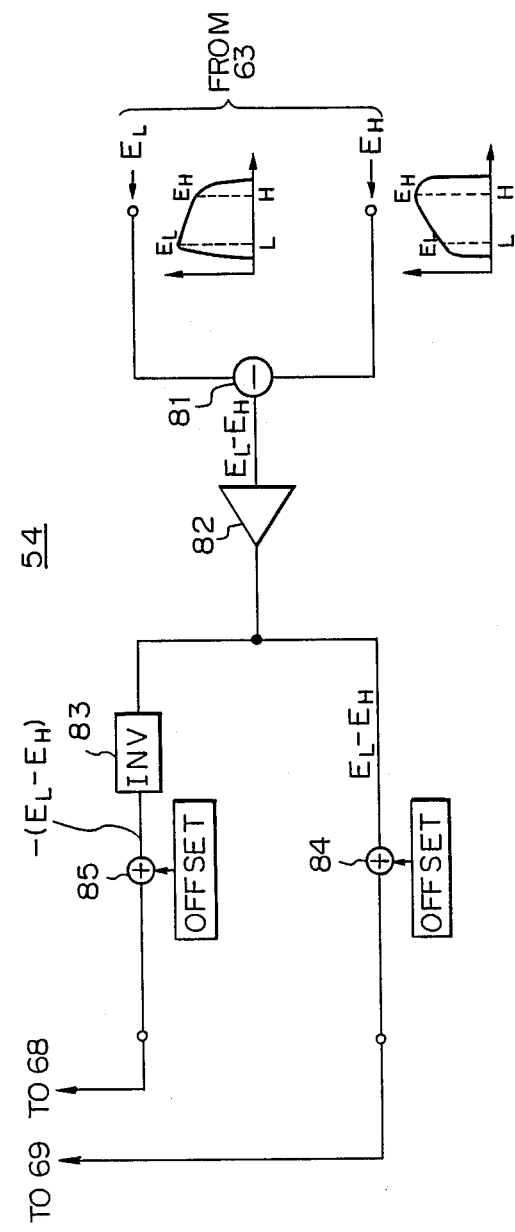
FIG. 16 is a view of an example of a control circuit in FIG. 14.

FIGS. 16 shows an example of the control circuit of FIG. 14. The low frequency (L) side output $E_L$ and high frequency (H) side output $E_H$ output from the detection circuit 63 are input to a subtractor 81 and the level difference $E_L - E_H$ of the two is calculated. If $E_L - E_H > 0$, a negative slope characteristic appears. If $E_L - E_H < 0$, a positive slope characteristic appears. The level difference $E_L - E_H$ is amplified by an amplifier 82, hen becomes the control input of the variable attenuator 69 (FIG. 14). If the attenuator 68 (FIG. 14) is also comprised of a variable attenuator, the polarity of the above-mentioned level difference is inverted by an inverter (INV) 83 to give $-(E_L - E_H)$. This is used as the control input for the attenuator 68. The adders 84 and 85 add an offset DC voltage to $E_L - E_H$ and $-(E_L - E_H)$ This sets the gain of the attenuator to the optimum reference value. It is possible to perform equalization by just the gain control of the attenuator 68, but if the gains of both the attenuators 68 and 69 are controlled, it is possible to perform the wide range equalization.

As explained above, according to the present invention, an amplitude equalizer is realized which can flatten the delay-frequency characteristic through addition of the outputs of two circuit means having opposite characteristics and can produce a strong frequency-amplitude characteristic. If such equalizer amplitudes are connected in parallel, a variable amplitude equalizer can be realized. In this case, level adjustment is performed on the positive slope and/or negative slope first order amplitude equalizer side. If this level adjustment is performed in accordance with the magnitude of the equalization residual appearing in the output signals, an automatic amplitude equalizer can be realized. Each of the above-mentioned amplitude equalizer, the variable amplitude equalizer, and the automatic amplitude equalizer can be realized with a simple construction.

We claim:

1. A variable amplitude equalizer having a positive slope first order amplitude equalization circuit at a first path, having a negative slope first order amplitude equalization circuit at a second path, having a varaible attenuator inserted in at least one of said first and second paths, and combining the signals of the said first and second paths, said positive slope and negative slope first order amplitude equalization circuits each comprising amplitude equalization circuits consisting of the series connection of:
    a minimum phase circuit which combines by a first combiner one of the two signals of a branched input signal with a signal comprised of the other signal delayed by a first delay element and attenuated by a first attenuator; and
    a non-minimum phase circuit which combines by a second combiner a signal comprised of one of the two signals of a branched input signal attenuated by a second attenuator and a signal comprised of the other signal delayed by a second delay element.

2. A variable amplitude equalizer according to claim 1, wherein in each of the said first path and said second path, a hybrid circuit which splits said input signal into the two signals and a hybrid circuit which combines said one and the other signals are provided at an input stage and an output stage of the minimum phase circuit and the non-minimum phase circuit, respectively, and
    the output stage and the input stage of the minimum and non-minimum phase circuits are connected by hybrid circuits.

3. A variable amplitude equalizer according to claim 2, wherein a first phase shifter is provided in series with the first delay element and the first attenuator of said minimum phase circuit on said first path and a second phase shifter is provided in series with the second delay element of said non-minimum phase circuit.

4. A variable amplitude equalizer according to claim 3, wherein said first and second phase shifters are adjusted to set an interval between a notch frequency in said first path and a notch frequency in said second path to $\frac{1}{2}\tau$, where $\tau$ is the delay time difference of signals running on said first path and said second path.

5. A variable amplitude equalizer according to claim 4, wherein said interval of $\frac{1}{2}\tau$ is set to $\pi/2$ and a third phase shifter having a phase shift of $\pi$ is provided at an initial stage of said first path.

6. An automatic amplitude equalizer comprising:
    a positive slope first order amplitude equalization circuit at a first path;
    a negative slope first order amplitude equalization circuit at a second path;
    a variable attenuator inserted in at least one of said first and second paths;
    a combiner which vector adds the outputs of said first and second paths; and
    feedback means for supervising the equalization residual appearing in the output of said combiner and controlling the attenuation amount of said variable attenuator in accordance with said equalization residual.

7. An automatic amplitude equalizer according to claim 6, wherein said positive slope and negative slope first order amplitude equalization circuits each comprise amplitude equalization circuits consisting of the series connection of:

a minimum phase circuit which combines by a first combiner a first of two signals of a branched input signal with a signal comprised of a second of the two signals delayed by a first delay element and attenuated by a first attenuator; and a non-minimum phase circuit which combines by a second combiner a signal comprised of a first of two signals of a branched input signal attenuated by a second attenuator and a signal comprised of a second of the two signals delayed by a second delay element.

8. An automatic amplitude equalizer according to claim 6, wherein each of said positive slope and negative slope first order amplitude equalization characteristics comprises one unit selected from the group of a known constant resistor network, a resonant automatic equalizer, and a transversal filter type automatic equalizer.

9. An automatic amplitude equalizer according to claim 6, wherein said feedback means comprises an automatic gain control amplification circuit connected to an output of said combiner, a detection circuit which detects an equalization residual appearing at an output of said automatic gain control amplitude circuit, and a control circuit which controls the attenuation amount of said variable attenuator by the detected output from said detection circuit.

10. An automatic amplitude equalizer according to claim 9, wherein said detection circuit comprises at least two narrow band filters which extract different frequency components and a detector connected to the same.

11. An automatic amplitude equalizer according to claim 9, wherein the control circuit comprises a subtractor which calculates the difference in levels of a low frequency side detected output and high frequency side detected output from said detection circuit, said level difference used for control of the gain of said variable, attenuator.

12. An automatic amplitude equalizer according to claim 11, wherein in addition to said level difference, an inverter is used to generate a second level difference inverted in level from the level difference, the two level differences used for controlling the gains of the positive slope side attenuator and negative slope side attenuator.

13. An automatic amplitude equalizer according to claim 11, further having an adder which adds an offset DC voltage to said level difference.

* * * * *